Aug. 8, 1939.  L. J. COOK  2,168,731
ANIMAL-CARCASS TONGUE PROTECTOR
Filed Feb. 29, 1936
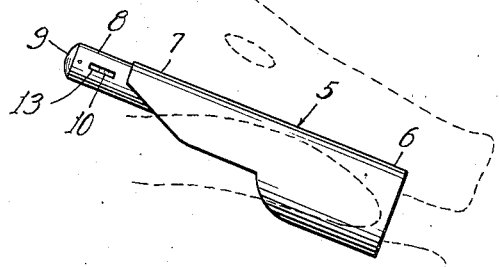
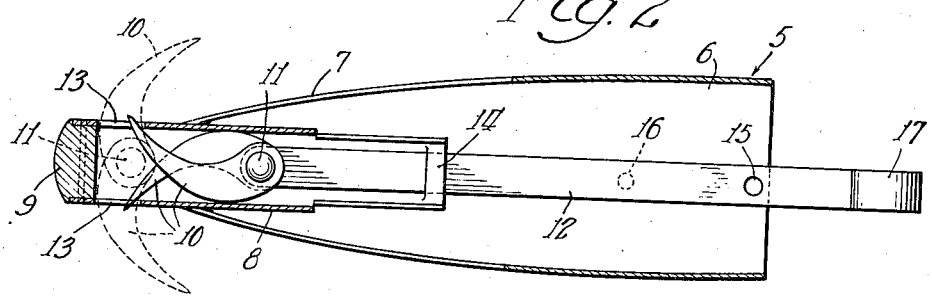
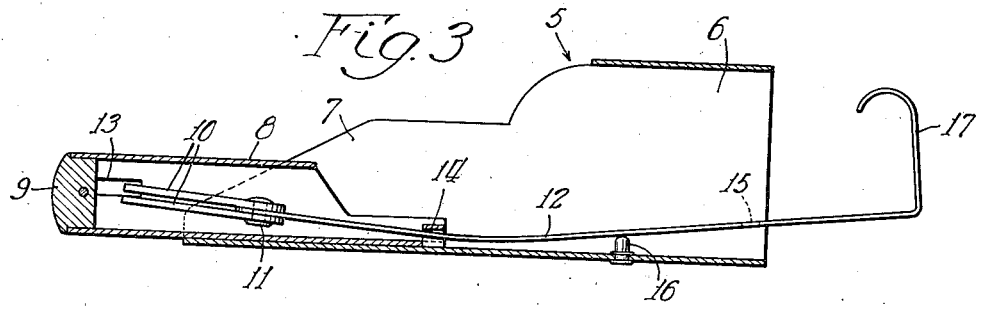
Leo J. Cook, Inventor Patented Aug. 8, 1939

2,168,731

UNITED STATES PATENT OFFICE 2,168,731

ANIMAL-CARCASS TONGUE PROTECTOR

Leo J. Cook, Chicago, Ill., assignor, by mesne assignments, to Industrial Patents Corporation, Chicago, Ill., a corporation of Delaware Application February 29, 1936, Serial No. 66,384

18 Claims. (Cl. 17—1)

This invention relates to a device for use in protecting the tongues of animal carcasses, such as, for instance, in the slaughtering of hogs and has for its primary object to provide a device for insertion in the animal's mouth, such as, for instance, the hog's mouth which will prevent mutilation of the hog's tongue by the teeth after the hog has been bled and is passing through the dehairing machine.

A further object of the invention is to provide a device for encasing the tongue of an animal carcass when inserted in the mouth of the animal carcass and having means for securely anchoring the device within the mouth of the animal carcass.

Another object of the invention is to provide a device of the above-mentioned character which is simple and durable in construction, reliable and efficient in use and inexpensive to manufacture.

Other objects and advantages of the invention will be apparent from a consideration of the following description.

In the accompanying drawing, forming a part of this specification and in which like numerals are employed to designate like parts.

Figure 1 is a side view showing the device inserted in the mouth of an animal carcass.

Figure 2 is a longitudinal horizontal sectional view of the device.

Figure 3 is a longitudinal vertical sectional view of the device.

In the drawing, wherein for the purpose of illustration, I have shown a preferred embodiment of my invention, the numeral 5 denotes the body of the device which is constructed of thin sheet metal or other suitable material. The body is shaped to form a tubular or cylindrical portion 6 at one end and a substantially semi-cylindrical portion 7 at its opposite end and is of such size as to encase the tongue of an animal carcass when inserted in its mouth. When introduced into the mouth of the carcass the portion 7 extends into the rear of the mouth and overlies the tongue. Extending longitudinally from the end of the portion 7 and secured thereto is a tube 8 which is closed at its outer end by the plug 9 and disposed within the tube 8 are two anchor arms 10 which are pivotally connected, as at 11, to the end of the adjusting rod 12. The anchor arms 10 are curved longitudinally and are adapted to be projected through the slots 13 in opposite sides of the tube 8 when the adjusting rod 12 is pushed inwardly. These anchor arms are of sufficient length, so that when projected from the tube they will penetrate the tissues of the mouth of the carcass and engage around the bones situated on each side of the tongue, thereby securely anchoring the device and preventing its accidental displacement. The adjusting rod 12 extends longitudinally of the body 5 and passes beneath the strap 14 which normally holds the adjusting rod against the wall of the body. The adjusting rod 12 is formed of spring metal and intermediate its length is provided with an opening 15 which engages the pin 16 projecting from the wall of the body when the adjusting rod is pushed inwardly, thereby locking the anchor arms in their projected position. A finger hook 17 is formed at the free end of the adjusting rod for actuating the rod to project or retract the anchor arms.

When the device is inserted into the mouth of a carcass the anchor arms 10 are in retracted position. When in proper position in the mouth the device is disposed around the tongue and by pushing the adjusting rod 12 inwardly the anchor arms 10 are projected into engagement with the said bones and are held in this position by reason of the pin 16 engaging the opening 15 in the adjusting rod, thereby locking the device against accidental displacement. When it is desired to remove the device, the adjusting rod is lifted and pulled outwardly, thereby retracting the anchor arms 10 into the tube 8, so that the device may be withdrawn from the mouth of the carcass.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:

1. A device of the character described comprising a tubular body adapted to surround and protect the tongue of an animal carcass, and anchoring means carried by said body.

2. A device of the character described comprising a tubular body adapted to surround and protect the tongue of an animal carcass, and retractible anchoring means carried by said body.

3. A device of the character described comprising a tubular body adapted to encase and protect the tongue of an animal carcass, anchoring arms, and means for projecting or retracting said anchoring arms.

4. A device of the character described comprising a tubular body adapted to encase and protect the tongue of an animal carcass, a tube extending from one end of said body, anchor arms disposed in said tube adapted to be projected therefrom, and means for projecting and retracting said anchor arms.

5. A device of the character described comprising a tubular body adapted to encase and protect the tongue of an animal carcass, a tube extending from one end of said body and having opposed slots, anchor arms in said tube adapted to be projected through said slots, an adjusting rod extending longitudinally of said tube and body and pivotally connected at one end to said arms, said rod being adapted to project and retract said anchor arms upon longitudinal movement thereof, and means for locking said rod to hold said anchor arms in projected position.

6. A device of the character described comprising a tubular body adapted to cover the tongue of an animal carcass and provided with a strap therein, a tube extending from one end of said body and provided with opposed slots, anchor arms in said tube adapted to be projected through said slots in said tube into engagement with the mouth of the carcass for body holding purposes, and an adjusting rod for projecting and withdrawing the arms extending under the strap and disposed and shiftable longitudinally of said tube and body.

7. A device of the character described comprising a tubular body for encasing the tongue of an animal carcass, a tube extending from one end of said body, anchor arms in said tube adapted to be projected through opposed slots in said tube into engagement with the mouth of the carcass for body securing purposes, and an adjusting rod for projecting and withdrawing the arm extending and shiftable longitudinally of said tube and body, and having the end thereof in the tube pivotally connected to the arms and its other or free end provided with a finger hook.

8. In a device of the class described, a tongue protector for enveloping the tongue and provided with means engaging within the mouth for holding the same in place against accidental dislodgment.

9. A device for protecting the tongue of an animal carcass, comprising a body member for enveloping the tongue and provided with a concave tongue engaging part, and means associated with the member and adapted to engage a portion of the mouth interior and hold said member in place against accidental dislodgment.

10. A device of the character described, comprising a body member adapted to cover, and protect against teeth slashing, the tongue of an animal carcass, and a tooth-like arm associated with the member and adapted to penetrate into the fleshy part of the mouth of the carcass and hold said member in place against accidental dislodgment.

11. A device of the character described, comprising a body member adapted to envelop and protect against teeth slashing, the tongue of an animal carcass, and a pointed arm associated with the body member and movably supported so that it may be moved relatively to the member into such engagement with the fleshy part of the mouth of the carcass as to hold said member against accidental dislodgment.

12. A tongue protector comprising a sheath and expansible arms spreadable within the mouth of a carcass for holding the sheath in position in the mouth of the carcass.

13. A tongue protector comprising a sheath and a pair of arms expansible in relatively opposite directions and spreadable within the mouth of a carcass for holding the sheath in position in the mouth of the carcass.

14. A tongue protector comprising a sheath and expansible arms spreadable within the mouth of a carcass for holding the sheath in position in the mouth of the carcass, each arm being provided with a pointed end.

15. The method of protecting a hog carcass tongue from mutilation which comprises placing an enveloping guard upon the tongue.

16. The method of protecting an animal carcass tongue from mutilation by the teeth which comprises enveloping the tongue with a guard and securing the guard within the mouth against accidental dislodgment.

17. The method of protecting an animal carcass tongue from mutilation which comprises securing an enveloping tongue protector within the mouth of the carcass whereby the teeth are prevented from mutilating the tongue.

18. In a tongue protector, an enveloping tongue guard and means for holding the guard in the mouth of a carcass.

LEO J. COOK.